May 13, 1941. R. E. HENDRICKSON 2,241,550
HIGH ANGLE WELL SURVEYING INSTRUMENT
Filed July 24, 1939

INVENTOR
RALPH E. HENDRICKSON
BY Lloyd Spencer
ATTORNEY

Patented May 13, 1941

2,241,550

UNITED STATES PATENT OFFICE 2,241,550

HIGH ANGLE WELL SURVEYING INSTRUMENT

Ralph E. Hendrickson, Glendale, Calif., assignor to Lane-Wells Company, Los Angeles, Calif., a corporation of Delaware Application July 24, 1939, Serial No. 286,201

3 Claims. (Cl. 33—205.5)

My invention relates to well bore survey instruments, and among the objects of my invention are:

First, to provide a high angle inclinometer and compass unit for survey instruments adapted to indicate with accuracy direction and inclination;

Second, to provide an instrument of this character in which the compass unit is maintained in a horizontal plane by the inclinometer element and is capable of being read throughout the range of operation of the inclinometer;

Third, to provide an instrument of this character in which the indications of the inclinometer and compass may be recorded on a photographic disc or film contained within the instrument and positioned coaxially with respect to the incilnometer and compass unit, the indications being photographed directly upon the disc or film irrespective of the position of the inclinometer;

Fourth, to provide a survey instrument wherein only the essential portions of the inclination and azimuth scales are in proper position to give a clear record, so that the resulting record is practically free of extraneous markers that might confuse;

Fifth, to provide a surveying instrument which is particularly designed to withstand the rough usage involved in its use within a well bore; and Sixth, to provide a surveying instrument in which the inclinometer is of a gimbal mounted type and in which the indicating elements of the inclinometer and compass unit are so arranged with respect to a supporting frame extending thereover that these elements may be photographed irrespective of the position of the supporting frame relative to the indicating elements.

With the above and other objects in view, as may appear hereinafter, reference is directed to the accompanying drawing, in which.

Figure 1:
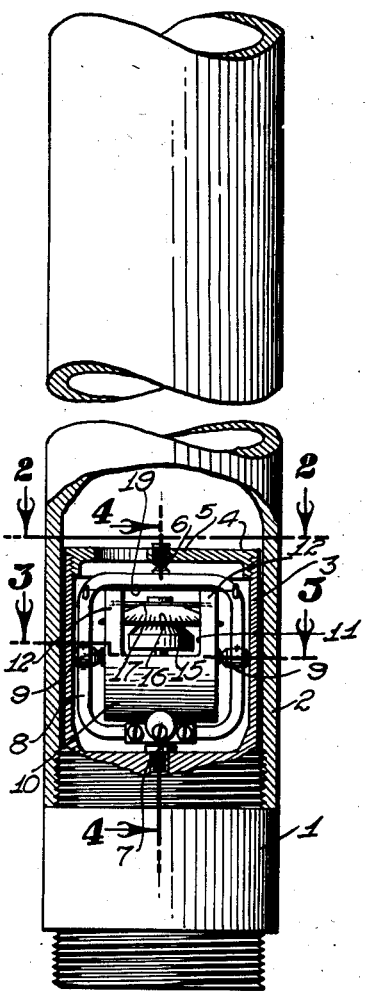
Figure 1 is a partial elevational, partial sectional and fragmentary view of a survey instrument incorporating my invention.
Figure 2:
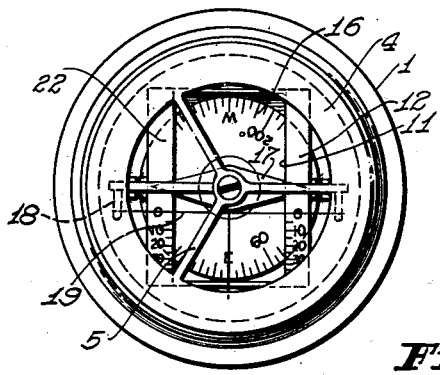
Figure 2 is a transverse sectional view thereof, through 2—2 of Figure 1, with the outer case omitted.
Figure 3:
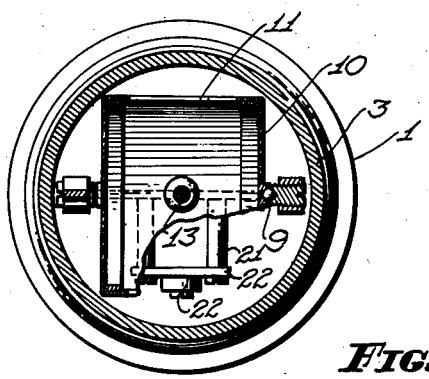
Figure 3 is a similar transverse sectional view through 3—3 of Figure 1.
Figure 4:
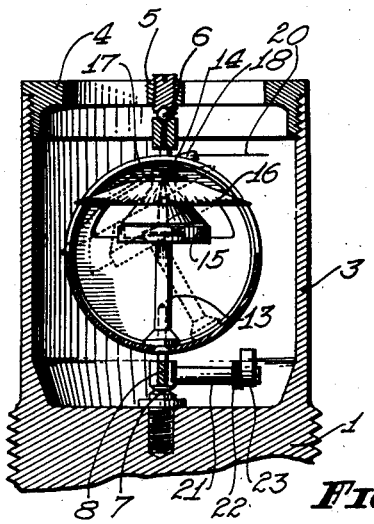
Figure 4 is a longitudinal sectional view through 4—4 of Figure 1, likewise with the outer case omitted.

A base member 1 in the form of a nipple, threaded at each end, is provided. One threaded end screws into an outer shell 2, and extending from this end is an inner shell 3 which fits within the outer shell and is provided at its extremity with a top ring 4. The top ring 4 incorporates a spider 5 comprising three radiating arms, in the center of which is provided a vertical gimbal bearing unit 6. In vertical alignment therewith the end of the base member 1 is provided with a second vertical gimbal bearing unit 7.

The two gimbal bearings 6 and 7 support a gimbal frame 8 of rectangular form with rounded corners. The gimbal frame 8 in turn supports by horizontal gimbal bearing units 9 an inclinometer drum 10. The inclinometer drum is solid and closed at both ends, except for a semi-circular peripheral slot 11 which forms the upper side of the drum into two semi-circular bands 12. These bands 12 are marked off in degrees of inclination and will be described in more detail hereinafter.

By reason of the slot 11 the opposite, or unslotted side of the drum is heavier so that the bands 12 tend to face upwardly. The lower side of the drum supports a compass pedestal 13 which extends upwardly to a point near the upper side of the drum. A compass mounting 14 seats upon the pedestal 13, the mounting 14 including a skirt 15 extending downwardly so as to place the center of gravity below its point of contact with the pedestal. Suitable retainer means are provided to prevent dislodging of the mounting. The mounting also carries a compass disc 16 which is frusto-conical and marked off in degrees of a circle around its periphery to form a compass card capable of being viewed from a wide range of angles. A compass needle 17 is provided on the compass disc.

The gimbal frame 8 is provided with two posts 18 extending outwardly a short distance from one side. These posts support a cross wire 19 which traverses the bands 12. To the center point of the cross wire 19 there is attached, by spot-welding, a second cross wire 20 which extends radially with respect to the center of the vertical gimbal mounting axis. The two semi-circular bands 12 are provided with inclinometer scales reading from zero to as high as 90 degrees, if desired.

In order that the side of the drum having the inclinometer scales reads from a zero point in one direction only, that is, to insure movement of the gimbal frame into a position in which the frame itself is at right angles to the plane of maximum inclination, weight arms 21 extend laterally from the frame, these being connected by a cross bar 22. Mounted on the cross bar is a balancing member 23 in the form of an eccentrically mounted weight which may be adjusted to the left or the right, as viewed in Figure 1, so that the two sides of the gimbal are accurately balanced with respect to the plane at right angles to the gimbal plane passing through its vertical axis.

Operation of my surveying instrument is as follows: When the instrument is inclined the gimbal frame assumes a position in the plane of maximum inclination. The inclinometer drum, however, maintains its position with respect to the vertical by reason of the fact that it has a greater mass below its point of support than it has above. In this case it should be understood that the total weight of the compass which is above the axis of the inclinometer drum is less than the mass below its axis. Thus, when the gimbal frame assumes a position in the plane of maximum inclination and the drum rotates to its normal position, in which the pedestal 13 is vertical, the inclination scales on the bands 12 may be read directly in degrees of inclination. The arrangement of the spider is such that its arms at no time cover both of the scales, so that in any position the inclinometer reading may be obtained.

The compass unit, that is, the compass disc, is somewhat larger in diameter than the width of the inclinometer drum; consequently, clearance slots are provided in the ends of the drum, these slots also serving to lighten the upper part of the drum and place the center of gravity below its horizontal axis. The compass disc is so marked that at least a sufficient part of the compass is always exposed so as to determine the direction indicated thereon. The compass reading is determined primarily by the second cross wire 20, although the first cross wire may be used should the wire 20 be obscured.

Figure 5:
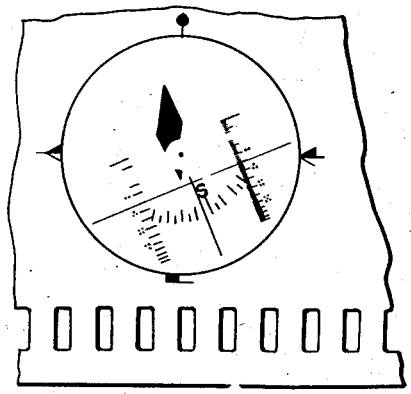
Figure 5 is a reproduction of the record obtained by a film or photographic disc.

All parts of the instrument within the sight of the photographic lens is black, except for the scale indicia, compass needle and cross or reference wires, consequently the photographic film produced while a "negative" shows the scale indicia in black against a substantially clear background, as indicated best in Figure 5.

The scale indicia is preferably engraved so as to reflect best when in a plane at right angles to the photographic axis. Thus, by reason of the conical form of the compass disc, the indicia on one side reflects better than the other. More specifically, the side of the compass disc which is under the reference wire 20 approaches a plane at right angles to the photographic axis as the instrument is tilted. The actual slope of the disc is preferably selected as approximately one-half the range of the instrument; thus, if the instrument is designed for sixty degrees of operation the slope of the compass disc would be about thirty degrees.

The ring 4 is provided with suitable reference indicia in Figure 5 which serves to orient the instrument with respect to its case. With further reference to Figure 5, the indicia illustrated is as follows:

Inclination: 25½°
Azimuth: 5° West of South

The compass needle is adjusted on the card to correct the magnetic declination, which for Los Angeles territory is approximately sixteen degrees.

Various changes and alternate arrangements may be made within the scope of the appended claims, in which it is my intention to claim all novelty inherent in the invention as broadly as the prior art permits.

I claim:

1. A surveying instrument comprising: a drum shaped inclination unit journaled about a horizontal axis, one side of said unit being cut away to form a pair of bands bearing inclination indicia, and the other side being weighted, whereby said bands tend to remain on the upper side of the unit; a gimbal frame including horizontal mounting means for said journals and vertically disposed mounting means; coacting supports for the vertical mounting means, the upper support being skeletonized to expose said bands; the relationship of said skeletonized supports and said bands being such that at least one of said bands is visible through said skeletonized supports for photographic recording; a reference hair cooperating with said inclination indicia and offset from the vertical axis of said gimbal frame; and a compass unit mounted within said inclination unit, said compass unit including a compass-bearing indicia element positioned approximately in the focal plane of said reference hair.

2. An oil well survey instrument, comprising: an inclinometer unit in the form of a cylindrical drum; a gimbal mounting including vertical and horizontal gimbal bearings, the latter journaling said inclinometer unit by its axial ends; a skeletonized framework coacting with one of the vertical gimbal units; said inclinometer unit having dual inclination scales arranged near the axial extremities of said drum and thus disposed in planes offset from the vertical axis of said gimbal mounting; and a reference hair for said inclination scales at right angles thereto and likewise extending in a plane offset from the vertical axis of said gimbal mounting, the relationship of said framework and said dual inclination scales being such that an intelligible portion of said inclination scales are, for all operating positions of said instrument, visible through said framework for recording.

3. A construction as set forth in claim 2, wherein said inclinometer unit is hollow and cut away between said inclination scales to receive a compass unit comprising: a pedestal extending from the bottom to the top of said inclinometer unit; a conical compass-indicating means having indicia around its periphery, one side of said means being in proximity to said reference hair, said side tending, upon tilting of said inclinometer unit, to move toward said reference hair and toward the vertical axis of said inclinometer unit.

RALPH E. HENDRICKSON.